Patented May 8, 1923.

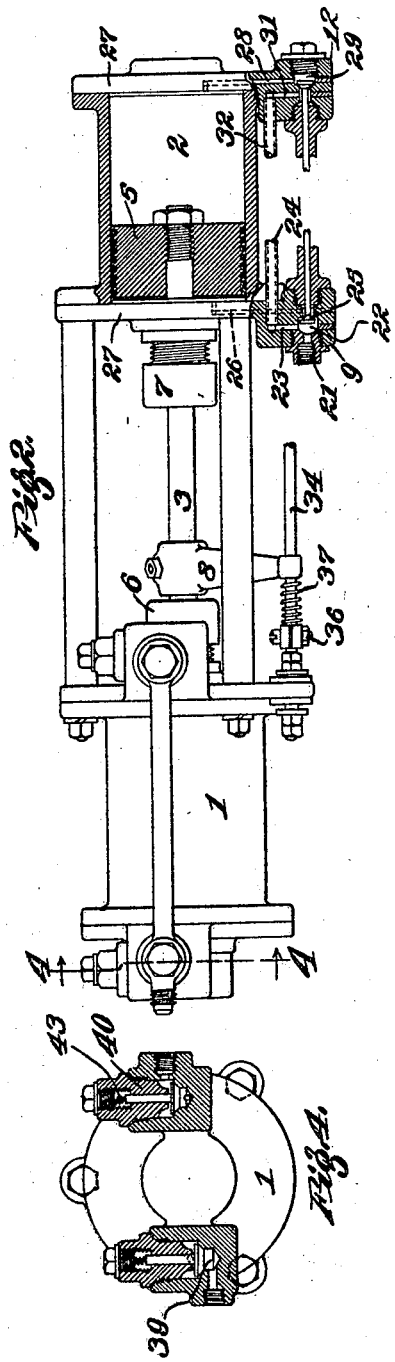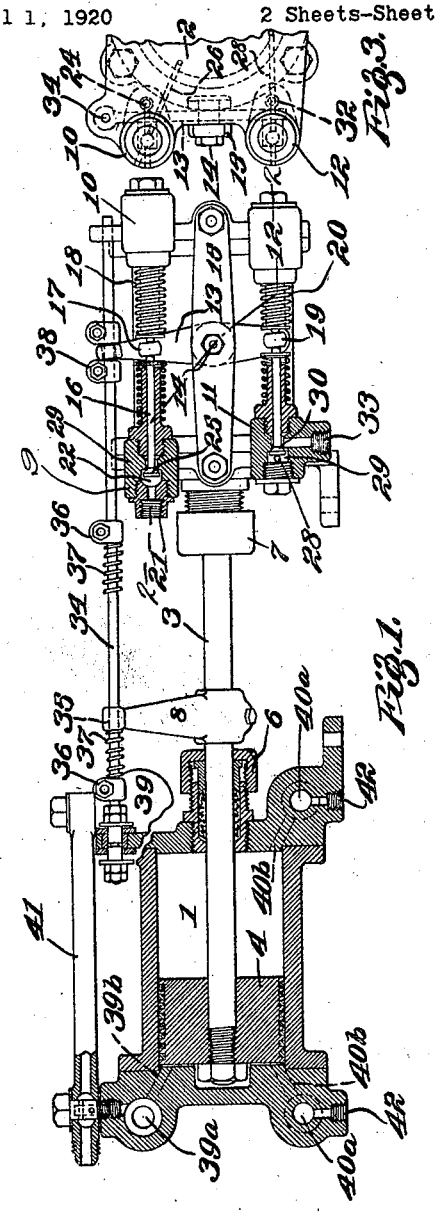

1,454,331

UNITED STATES PATENT OFFICE.

EDWARD C. NEWCOMB, OF SCITUATE, MASSACHUSETTS, ASSIGNOR TO STANDARD ENGINEERING COMPANY, OF ST. LOUIS, MISSOURI.

VALVE MECHANISM.

Application filed April 1, 1920. Serial No. 370,364.

*To all whom it may concern:*

Be it known that I, EDWARD C. NEWCOMB, a citizen of the United States, residing in the town of Scituate, county of Plymouth, and State of Massachusetts, have invented new and useful Improvements in Valve Mechanism, of which the following is a specification.

This invention relates to valve mechanism adapted to be used in the construction of engines or pumps, and although features of the invention may be applied to engines and pumps of different types, the valve mechanism is expected to be particularly useful when applied to reciprocating steam pumps for controlling the operation of the valves of the steam cylinder. The general object of the invention is to produce a valve mechanism of simple construction which will operate to effect the quick opening and closing of the valves and which will operate to impart a reduced movement from a movable part of the engine to the valves without necessitating the use of a complicated motion reduction mechanism. In practicing this feature of the invention I absorb relatively large reciprocating movement of the piston by means of a spring or springs which are compressed by a portion of the reciprocating movement and store up energy which is utilized to move the valves. By reason of the use of these springs, the opening and closing movements of the valves are quick and this tends toward efficiency in operation of the engine.

Further objects of the invention will appear hereinafter.

The invention consists in the novel features, and in the general combination of parts to be particularly described hereinafter, all of which contribute to produce a simple and efficient valve mechanism. A preferred embodiment of my invention will be particularly described in the following specification, while the broad scope of my invention will be pointed out in the appended claims.

In the drawing,

Figure 1 is a side elevation and partial section through a steam-driven reciprocating pump embodying my invention;

Figure 2 is a plan, the valves being shown in cross-section, as on line 2—2 of Fig. 1, with their actuating mechanism omitted;

Figure 3 is an end elevation of the pump taken at the steam end and partially broken away;

Figure 4 is a section taken about on the line 4—4 of Figure 2;

Figure 5:
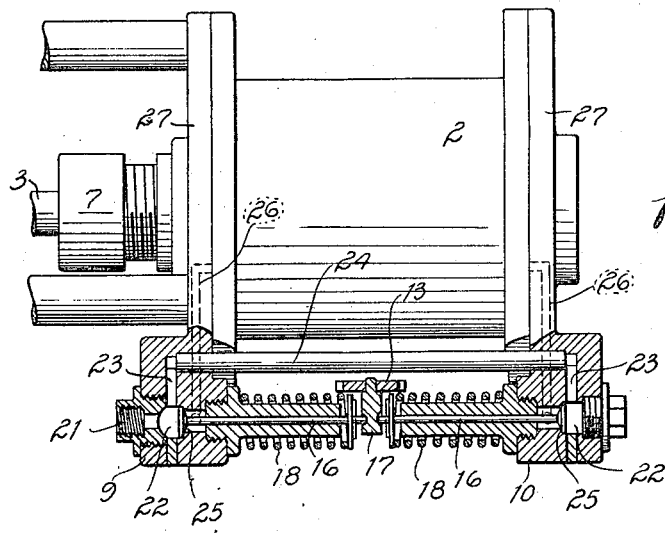
Figure 5 is a horizontal section taken through the inlet valves and illustrating the communicating connection between them, and their relation to the inlet ports in the cylinder heads.
Figure 6:
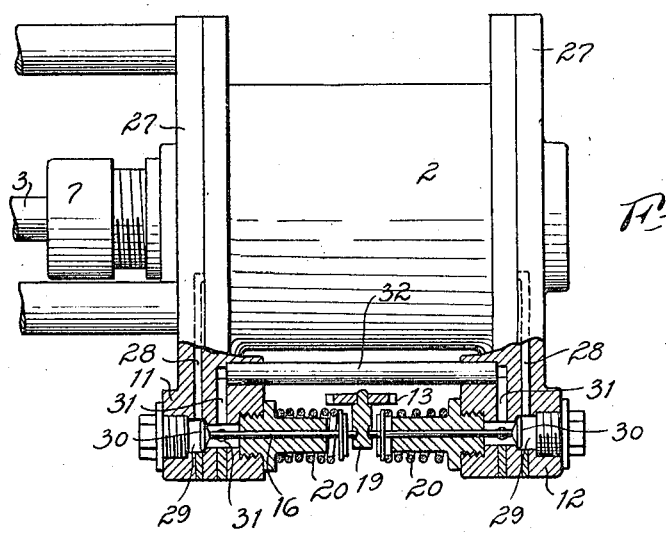
Figure 6 is a horizontal section through the exhaust valves illustrating their communicating connection and showing their relation to the exhaust ports.

In practicing the invention I provide a movable member which is mounted in any suitable manner so that it will be moved by the operation of the engine or pump. As this member moves it imparts motion through a spring to an actuating member which actuates the valves. If desired, this movable member may be attached directly to the piston or to another reciprocating part of the engine; near the end of each stroke this movable member comes into contact with a spring and compresses the spring, and through the spring imparts the opening and closing movements to the valves. In this way I impart a reduced amount of movement to the valve mechanism which, however, is sufficient to effect the operation of the valves. In the present instance I have illustrated the invention as applied to a common type of tandem cylinder steam-driven reciprocating pump. A water cylinder 1 and steam cylinder 2 have a common piston rod 3 which is attached to the pump piston 4 and the steam piston 5. The piston rod passes through suitable stuffing-boxes 6 and 7 in the adjacent heads of the pump cylinder and steam cylinder. To the piston rod 3, I attach a movable member 8 which moves to or fro at each stroke of the engine; on each side of this member 8 I provide a spring which is compressed by the last part of the movement in each stroke and thereafter imparts the movement to the valves.

I shall now describe the valves and the contiguous parts of the valve mechanism. These valves are of reciprocating and poppet type, mounted so as to open by a sliding movement away from the middle transverse plane of the cylinder. The steam cylinder may be provided with two inlet valves 9 and 10 which are preferably disposed opposite to each other and is likewise provided with two exhaust valves 11 and 12 which are also disposed opposite to each other. Between the valves I provide actuating means which may be in the form of a rocker 13 pivotally mounted at 14 on a bar 15 (see Fig. 1), the ends of the bar 15 being secured to the engine frame. This actuator or rocker is provided with any suitable means operating in such a way, that when the rocker moves in one direction, it opens an inlet valve at one end of the cylinder and opens an exhaust valve at the opposite end of the cylinder. This effect may be very simply accomplished by placing the stems 16 of the inlet valves substantially in alignment with each other so that they may be operated alternately by a tappet 17 in the form of a lug projecting from the face of the rocker. Each inlet valve is provided with a spring 18 for returning it to its seat. In the position of the rocker shown in Figure 1, the inlet valve 9 is open and the valve 10 will be closed.

The exhaust valves 11 and 12 may be alternately opened by an exhaust tappet 19 and these valves are normally held on the seats by a spring 20 corresponding to each valve. Live steam is admitted through a cap or bonnet 21 screwing into the end of the valve 9 in which a steam chest 22 is formed; a similar steam chest is formed in the valve 10 and these steam chests communicate by horizontal ports 23 with an inlet manifold or pipe 24; this manifold inlet admits steam to the inlet valve 10. In each of the valves 9 and 10 the live steam is admitted on the outer side of the valve head 25.

Each of the valves 9 and 10 is provided with an inlet port 26 (see Figs. 2 and 3) which admits steam through the adjacent cylinder-head 27. These ports 26 of course communicate with the valve chamber of each valve under the valve head 25, so that when the valve is lifted off its seat steam will flow into the cylinder. Each cylinder head 27 is also provided with an outlet port 28 (see Figs. 2 and 3), and each of these ports 28 communicates with the valve chamber 29 of the exhaust valve 12 above the valve head 30 of the exhaust valve (see Figs. 1 and 3); each valve chamber 29, below the valve head is provided with a laterally extending port 31, and these ports are connected by a manifold or pipe 32 so that the exhaust steam from the valve 12 is carried over in the pipe 32 to the exhaust valve 11 from which the exhaust steam passes through an outlet 33 (see Fig. 1). The manifolds 24 and 32 are simply tubes, the ends of which extend into the heads 27.

In order to operate the actuating member or rocker 13, I provide a stem 34 which is mounted to slide longitudinally on the engine frame. This stem 34 passes loosely through a bore 35 in the end of the arm 8 and is provided with two adjustable fixed collars 36. Adjacent to each collar 36 a spring 37 is provided disposed around the stem 34. At each stroke of the engine the end of the arm 8 engages one of the springs 37 and imparts movement through spring 37, to the corresponding collar 36 and thereby causes a longitudinal shifting movement of the stem 34. This movement is imparted to the rocker 13 by means of two adjustable fixed collars 38 which engage opposite sides of the upper end of the rocker (see Fig. 1).

Any suitable valve mechanism for the water cylinder 1 may be provided. For this purpose I may employ a simple inlet check valve 39 (see Fig. 4), and an outlet check valve 40. The valve chamber 39ª of the inlet valve communicates with the interior of the cylinder 1 through a suitable inlet port 39ᵇ. Likewise, the valve chamber 40ª of the outlet valve communicates with the interior of the cylinder 1 through a suitable outlet port 40ᵇ. If desired, two inlet valves may be connected together by a manifold 41. Of course, a similar manifold could be used for connecting up the outlet valves. However, as illustrated, I have simply shown each of these valves with an outlet 42 (see Fig. 1). The check valves 39 and 40 may be of any suitable construction as illustrated and may be provided each with a spring 43 tending to return them to their seats.

In the mode of operation of the valve mechanism it should be understood, that a moving part of the engine, for example, the arm 8, at each stroke compresses one of the springs 37 near the end of its stroke. For instance, suppose that the arm 8 moves toward the right from the position that it is shown in Figure 1; as the piston nears the end of its stroke the spring 37 at the right of the arm 8 will be compressed and will store up energy very rapidly, the force that this spring can exert therefore, suddenly becomes much greater than the force necessary to unseat the valve head 25 of the inlet valve 10; this will cause the valve 10 to open and admit steam to the right hand end of the cylinder 2 through the port 26 (see Fig. 3). The raising of the valve is of course accomplished by the rocking movement of the rocker 13 in a clockwise direction caused by the shifting of the stem 34 toward the right. This rocking movement of the rocker also unseats the valve head 30 of the exhaust valve 11 and allows steam in the cylinder 2 to exhaust through the port 28 and outlet 33. A similar mode of operation occurs during the opposite stroke of the engine; at each stroke of the engine toward the right, water flows into the pump cylinder 1 through the valve 39 which is located at the left end of the cylinder; on the return stroke the water is forced out through the outlet valve 40. A similar mode of operation occurs with the valves at the other end of the cylinder 1 during the other stroke of the piston.

It is understood that the embodiment of the invention described herein is only one of the many embodiments my invention may take, and I do not wish to be limited in the practice of my invention nor in my claims, to the particular embodiment set forth.

What I claim and desire to secure by Letters Patent, is:

1. In a valve mechanism for a steam engine, the combination of a steam cylinder, a steam piston reciprocating therein, inlet and exhaust valves for controlling the flow of steam to and from the cylinder, a rocker extending transversely to the cylinder, a member for actuating the rocker, means for moving the same by the piston in each reciprocating movement thereof, the inlet valves being located opposite to each other, one at each end of the cylinder, and the exhaust valves being located opposite to each other, one at each end of the cylinder, a spring associated with each valve to close the same after it has been opened, an inlet tappet carried by said rocker between said inlet valves, and an exhaust tappet carried by said rocker between said exhaust valves, said tappets cooperating when the rocker is actuated to open an inlet valve at one end of the cylinder and simultaneously open an exhaust valve at the opposite end of the cylinder.

2. In a valve mechanism for a steam engine, the combination of a steam cylinder, a steam piston reciprocating therein, inlet and exhaust valves for controlling the flow of steam to and from the cylinder, a rocker extending transversely to the cylinder, a member moving with the piston, a spring on each side of said member, actuating means moved by said member through one of the springs at each stroke of the piston rod, an inlet tappet on said rocker, the inlet valves being located on opposite sides of the inlet tappet, an exhaust tappet on said rocker, the exhaust valves being located on opposite sides of said exhaust tappet, a spring associated with each valve to close the same after it has been opened, the inlet tappet being adapted to engage and open one of the inlet valves when moved in one direction and the other inlet valve when moved in the other direction, the exhaust tappet being adapted to engage and open one of the exhaust valves when the rocker moves in one direction and engage and open the other exhaust valve when the rocker moves in the other direction.

3. In a valve mechanism for a steam engine, the combination of a steam cylinder, a piston, a piston rod attached to the piston, a stem guided to move substantially parallel with the piston rod, an arm carried by the piston rod, collars carried by the stem on each side of the arm, a spring on the stem adjacent to each collar on each side of the arm whereby the arm imparts a sliding movement to the stem by a force acting through a spring in each stroke of the piston, a rocker mounted so as to be rocked by said stem, a pair of inlet valves located respectively on opposite sides of the rocker, a pair of exhaust valves located respectively on opposite sides of the rocker, an inlet tappet carried by the rocker for alternately engaging and opening said inlet valves, and an exhaust tappet carried by said rocker for alternately engaging and opening said exhaust valves.

4. In a valve mechanism, the combination of a steam cylinder, an inlet poppet-valve at each end of the cylinder and having a head with a stem projecting toward the middle transverse plane of the cylinder, said inlet valves being located opposite to each other, a spring at each inlet valve for returning the same to its seat, each of said inlet-valves having its steam chamber adjacent the outer side of the head, and said cylinder having an inlet port for each inlet valve on the side of the valve head adjacent to the valve stem, an exhaust poppet-valve for each end of the cylinder, said exhaust valves being located opposite to each other and each having a head with a stem extending toward the middle transverse plane of the cylinder. said cylinder having an exhaust port for each exhaust valve located adjacent the outer side of the valve head, and an exhaust outlet located on the side of the valve head adjacent the valve stem, a spring with each exhaust valve for returning the same to its seat, and reciprocating means located between the valve stems for actuating the inlet valve stems alternately and the exhaust valve stems alternately.

5. In a valve mechanism for a steam driven pump, the combination of a fixed steam cylinder, a piston with a piston rod reciprocating in the cylinder, a head at each end of the cylinder and constructed as a separate piece, an inlet valve for each end of the cylinder, said inlet valves being disposed opposite to each other, one in each head, a tube consisting of a separate part connecting and opening communication between the two inlet valves, an exhaust port and an exhaust valve in each cylinder head, said exhaust valves being located opposite to each other, a tube consisting of a separate part connecting and opening communication between the two exhaust valves, a rocker secured to and mounted so that it is capable of only a rocking movement upon a fixed pivot at the side of the cylinder and having a tappet corresponding to the inlet valves to open the same alternately, and a second tappet corresponding to the exhaust valves for opening the exhaust valves alternately, and means carried by the piston rod for actuating the tappet.

In testimony whereof, I have hereunto set my hand.

EDWARD C. NEWCOMB.